United States Patent [19]

Sone

[11] Patent Number: 5,131,330
[45] Date of Patent: Jul. 21, 1992

[54] CYLINDRICAL LINEAR TRANSPORTATION SYSTEM WITH LINEAR MOTOR PROPULSION

[75] Inventor: Kazuji Sone, Tokyo, Japan

[73] Assignee: Mitsubishi Denki Kabushiki Kaisha, Tokyo, Japan

[21] Appl. No.: 686,560

[22] Filed: Apr. 17, 1991

[30] Foreign Application Priority Data

Jun. 14, 1990 [JP] Japan .................. 2-156034

[51] Int. Cl.⁵ ................. B61B 13/04; E01B 25/10; B60L 13/02
[52] U.S. Cl. ................. 104/119; 104/138.1; 104/290; 105/141
[58] Field of Search ............. 104/89, 93, 106, 107, 104/109, 118, 119, 138.1, 290, 242; 105/141, 150, 154

[56] References Cited

U.S. PATENT DOCUMENTS

| 574,938 | 1/1897 | Pikze | 104/138.1 |
|---|---|---|---|
| 2,041,607 | 5/1936 | Hopkins | 104/292 |
| 2,788,749 | 4/1957 | Hinsken et al. | 104/118 |
| 4,201,137 | 5/1980 | Lagsdin | 104/119 X |
| 4,503,778 | 3/1985 | Wilson | 104/119 X |
| 4,570,543 | 2/1986 | Ishikura et al. | 105/150 X |
| 4,848,538 | 7/1989 | Vaida et al. | 198/687.1 |
| 4,860,662 | 8/1989 | Matsumoto et al. | 104/290 X |

FOREIGN PATENT DOCUMENTS 2209318 5/1989 United Kingdom ............. 104/118

Primary Examiner—Robert J. Oberleitner
Assistant Examiner—S. Joseph Morano
Attorney, Agent, or Firm—Sughrue, Mion, Zinn, Macpeak & Seas

[57] ABSTRACT

A linear motor transportation system is constituted by a movable member 11A in the form of a ring and a plurality of cylindrical stationary portions 3B-3E arranged in series to form a cylindrical guide. The movable member has an inner diameter larger than an outer diameter of the cylindrical guide and is slidably fitted on the cylindrical guide. A transportation table 14 is fixedly secured to the movable member to transport an article 15. A plurality of parallel grooves 3a are formed in an outer surface of the cylindrical guide and the movable member is provided on its inner surface with a corresponding number of rollers 11a, 11b engaged with the respective grooves to stably guide the movable member therealong.

2 Claims, 3 Drawing Sheets

CYLINDRICAL LINEAR TRANSPORTATION SYSTEM WITH LINEAR MOTOR PROPULSION

BACKGROUND OF THE INVENTION

The present invention relates to an improvement of a linear transportation system for transporting an article without using any transmission mechanism.

FIG. 4 is a perspective view of a conventional linear transportation system which includes a pair of upper parallel guides 1 (only are is shown) and a pair of lower parallel guides 1' (only one is shown). Between the upper and lower guide pairs 1, a linear motor mechanism is arranged. The linear motor mechanism includes a plurality (only two are shown in FIG. 4) of series arranged, flat stationary portions 3 and 3A mounted on the lower guides 1. Primary windings are embedded therein as is well known. The linear motor mechanism further includes a slider 11 as a movable member, which is disposed above the stationary portions 3 and 3A with a constant spacing D therebetween. An article to be transported (not shown) is disposed on the movable member. The slider 11 contains a secondary conductor (not shown) embedded therein. The slider 11 further has a plurality of rollers 2 on opposite edge portions thereof for smoothing its movement along the upper guides 1.

As shown in FIG. 5 which is a block diagram of a driving arrangement for the linear motor mechanism, the stationary portions 3 and 3A are driven by an a.c. power source 4 through a plurality of contacts 5 and 5A which on-off control the a.c. current to be supplied to the primary windings of the stationary portions 3 and 3A.

A plurality of brake mechanisms 6 and 6A are provided for applying braking force to the movable member via the stationary portions 3 and 3A. These brake mechanisms 6 and 6A are selectively energized by a brake power source 7 through a plurality of contacts 8 and 8A.

A controller 9 controls the driving power source 4 and the brake power source 7 according to running instructions which may be preprogrammed or given by an operator. A position sensor 10 is connected to the controller 9 to feed back the position of the slider 11.

The slider 11 is supported by reactive forces produced by the lower guides 1 and driven by a varying magnetic field produced by the stationary portions 3 and 3A therealong. The position of the slider 11 along the guides 1 is detected by the position sensor 10.

As will be clear to those skilled in the art, in order to obtain a stable driving torque in the conventional linear transportation system mentioned above, the gap D between the stationary portions 3 and 3A and the slider 11 has to be always maintained constant. In order to realize this, the guides 1 have to be machined and assembled with high precision, and thus the maintanace and/or regulation of the guides 1 is complicated, time consuming and requires considerable labor.

SUMMARY OF THE INVENTION

An object of the present invention is to provide a cylindrical linear transportation system which does not use high precision, expensive guide means and in which maintenance and regulation are simplified.

The above object can be achieved by the provision of a cylindrical linear transportation system according to the present invention, which includes a linear motor having a cylindrical stationary portions arranged in series to form a cylindrical guide, and a movable member slidably fitted thereon. The movable member is supported by the cylindrical stationary guide, and driven by a varying magnetic field therealong. Since the cylindrical stationary portions also serve as guide means for the movable member, necessity of separate guide means is eliminated and maintenance and regulation of the cylindrical stationary portion as the guide means are simplified.

DETAILED DESCRIPTION OF THE PREFERRED EMBODIMENT

An embodiment of the present invention will be described with reference to FIGS. 1 to 3.

Figure 1:
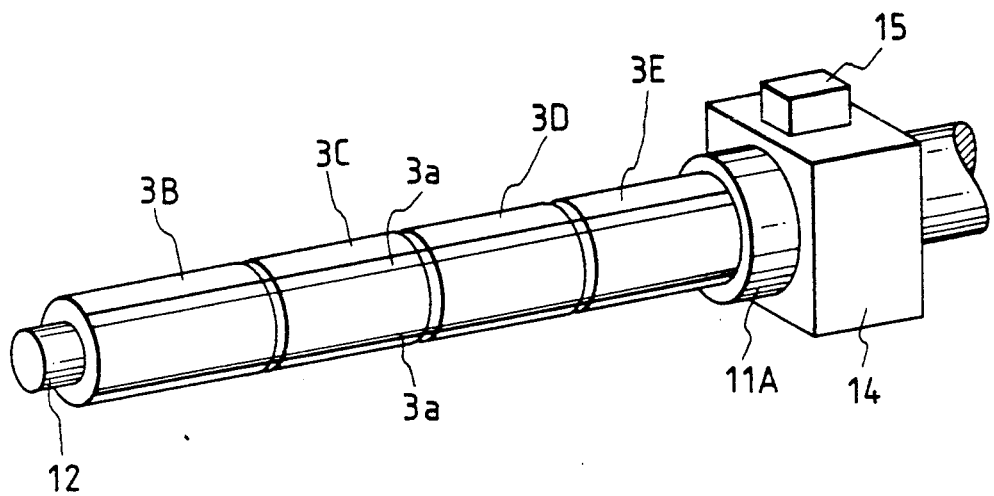
FIG. 1 is a perspective view of an embodiment of a cylindrical transportation system according to the present invention.
Figure 2:
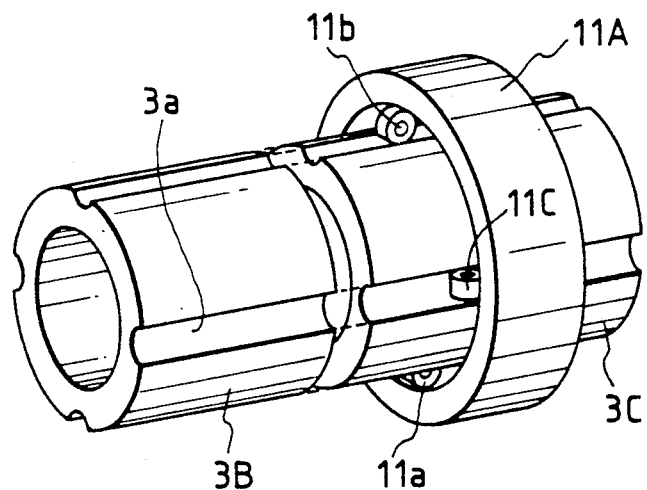
FIG. 2 is an enlarged perspective view of a portion of the system shown in FIG. 1, showing the relation of a movable member thereof with respect to a stationary portion, in detail.

In FIGS. 1 and 2, a cylindrical guide is formed by connecting a plurality of cylindrical stationary portions 3B, 3C, 3D and 3E in series on a circular pipe 12 supported at its opposite ends by appropriate means (not shown). Each cylindrical stationary portion is formed on its outer surface with a plurality of grooves 3a extending therealong, and the cylindrical stationary portions are arranged such that the grooves are aligned.

On the cylindrical guide formed by the series connection of the stationary portions 3B, 3C, 3D and 3E, a slider 11A in the form of a ring is movably fitted and serves as a movable member of this system. The slider 11A has a secondary conductor embedded therein and is provided on an inner surface thereof with a plurality of rollers 11a, 11b, 11c etc., which engage with the grooves 3a on the cylindrical guide, respectively, as shown in FIG. 2, to keep a distance between the outer surface of the cylindrical guide and the inner surface of the slider 11A constant. A transportation table 14 having a through hole whose diameter is substantially equal to an inner diameter of the slider 11A is fixedly secured to one end of the slider 11A. An article 15 to be transportated is disposed on the transportation table 14.

Figure 3:
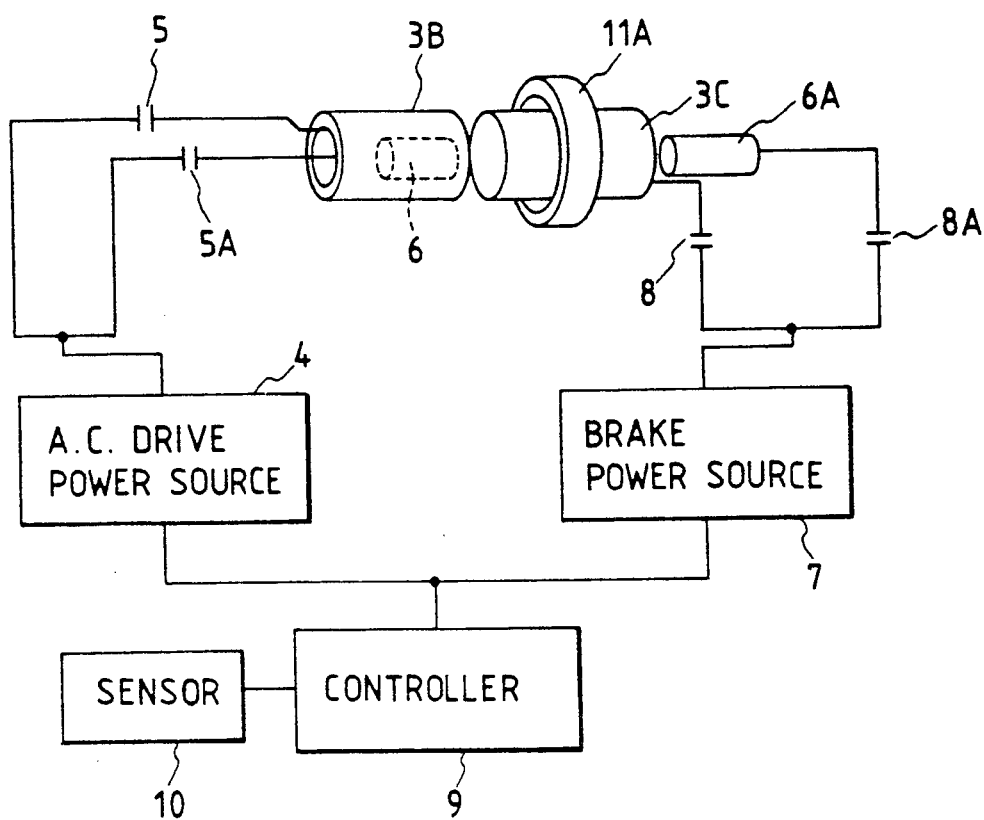
FIG. 3 is a circuit diagram of a driving arrangement for the linear transportation system shown in FIG. 1.
Figure 4:
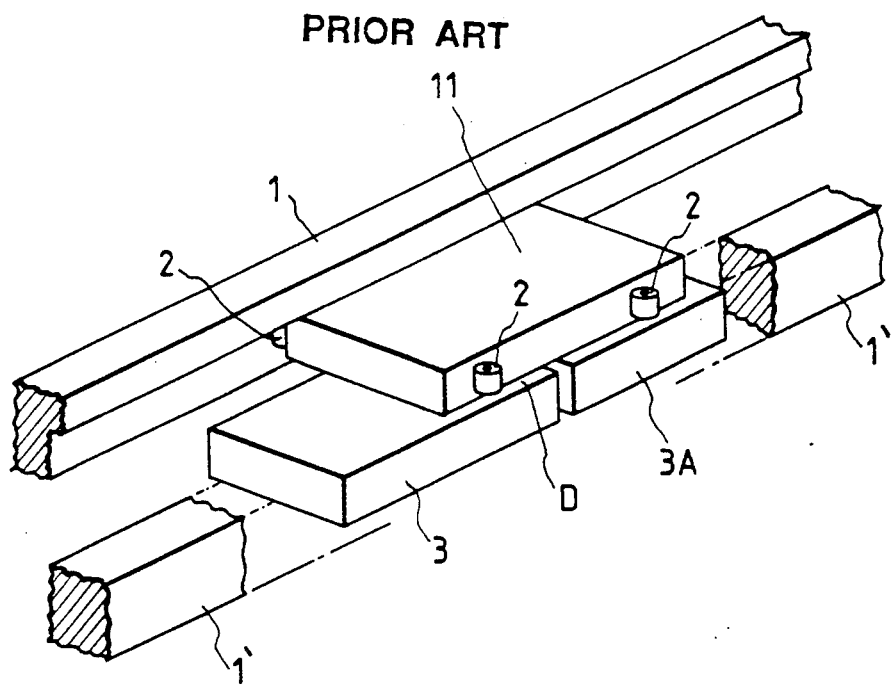
FIG. 4 is a perspective view of a conventional linear transportation system.
Figure 5:
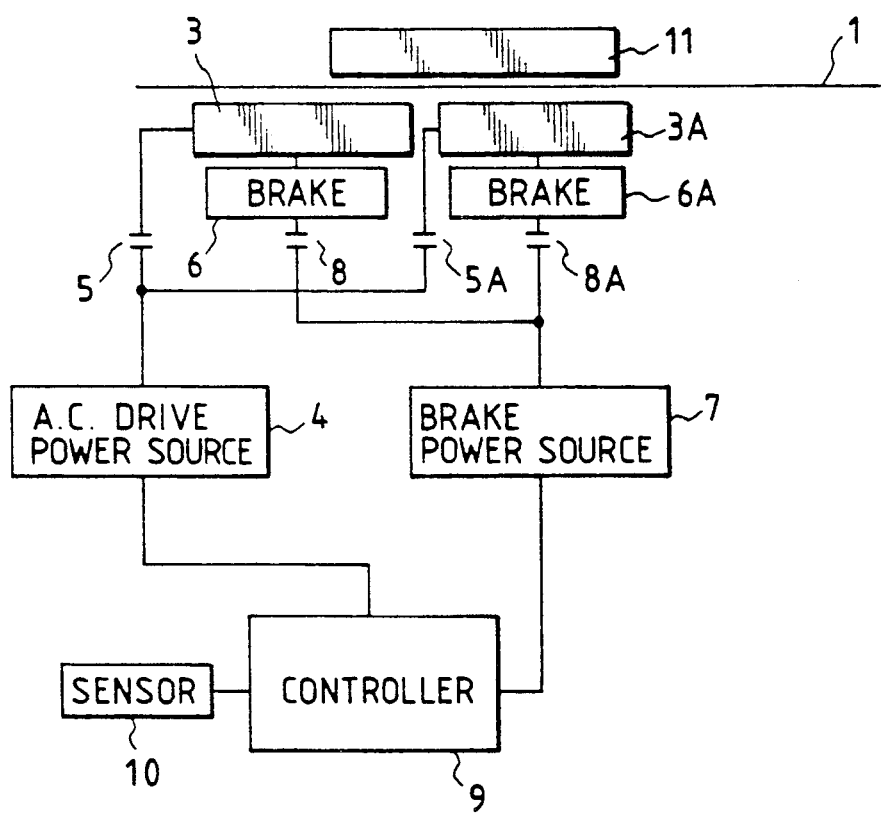
FIG. 5 is a block diagram of a driving arrangement for the system of FIG. 4.

In FIG. 3, the stationary portions 3B and 3C, for example, are magnetically driven by an a.c. driving power source 4 through a plurality of contacts 5 and 5A. A plurality of braking members 6 and 6A are suitably disposed along and within the guide portions. These brake members 6 and 6A are energized by a brake power source 7 through contactors 8 and 8A, respectively. The driving and brake power sources 4 and 7 are controlled by a controller 9 to which a position sensor 10 for sensing the position of the slider 11A along the linear motor is connected.

Thus, the slider 11A is guided by magnetic fields produced by the stationary portions 3B, 3C, 3D and 3E and moved therealong by drive torque thus produced to transport the article 15 mounted thereon over the length of the cylindrical guide.

As described, since the slider 11A is guided by the stationary portions of the linear motor themselves, it is possible to eliminate the high precision, expensive running guide members, to thereby facilitate maintenance and regulation of the transportation system. Further, since the stationary portions as well as the slider of the linear motor mechanism are cylindrical, their manufacturing is substantially facilitated.

What is claimed is:

1. A linear motor transportation system, comprising:
   a) an elongate, cylindrical guide defined by a plurality of stationary cylindrical members (3B–3E) arranged in series,
   b) a plurality of primary windings individually embedded in the cylindrical members,
   c) a plurality of circumferentially spaced, parallel guide grooves (3a) formed in an outer surface of the cylindrical guide,
   d) a movable member surrounding the cylindrical guide and defined by a closed cylindrical ring (11A) having an inner diameter larger than an outer diameter of the guide,
   e) a plurality of circumferentially spaced rollers (11a, 11b) mounted on an inner surface of the ring and individually cooperable with the guide grooves,
   f) a secondary conductor embedded in the movable member,
   g) support member (14) fixed to the movable member for supporting an article (15) to be transported, and
   h) control circuit means for selectively energizing the primary windings to produce a varying magnetic field which interacts with the secondary conductor to drive the movable member along the cylindrical guide.

2. A linear motor transportation system according to claim 1, further comprising a plurality of braking members (6, 6A) individually disposed within the cylindrical members, and wherein the control circuit means selectively energizes the braking members to halt the movable member.

* * * * *